United States Patent
Kubota

(10) Patent No.: US 7,782,403 B2
(45) Date of Patent: Aug. 24, 2010

(54) NOISE DETECTION APPARATUS AND METHOD, AND NOISE REDUCTION APPARATUS AND METHOD

(75) Inventor: Kenji Kubota, Yokohama (JP)

(73) Assignee: Victor Company of Japan, Ltd., Kanagawa-Ken (JP)

(*) Notice: Subject to any disclaimer, the term of this patent is extended or adjusted under 35 U.S.C. 154(b) by 1062 days.

(21) Appl. No.: 11/494,321

(22) Filed: Jul. 27, 2006

(65) Prior Publication Data

US 2007/0024748 A1 Feb. 1, 2007

(30) Foreign Application Priority Data

Jul. 29, 2005 (JP) .............................. 2005-219813

(51) Int. Cl.
*H04N 5/21* (2006.01)
*G06G 9/40* (2006.01)

(52) U.S. Cl. ...................................... 348/607; 382/268

(58) Field of Classification Search ................. 348/607, 348/611, 614, 618, 624, 627, 666, 533–535; 382/268, 270, 232, 233
See application file for complete search history.

(56) References Cited

U.S. PATENT DOCUMENTS

| | | | | |
|---|---|---|---|---|
| 5,657,401 A | * | 8/1997 | De Haan et al. | 382/275 |
| 5,883,983 A | * | 3/1999 | Lee et al. | 382/268 |
| 6,738,528 B1 | * | 5/2004 | Nio et al. | 382/268 |
| 7,019,791 B2 | * | 3/2006 | Yoshizawa et al. | 348/738 |
| 7,567,300 B2 | * | 7/2009 | Satou et al. | 348/609 |
| 7,676,111 B2 | * | 3/2010 | Yamauchi | 382/275 |
| 2004/0032532 A1 | * | 2/2004 | Akiyama et al. | 348/607 |
| 2007/0268410 A1 | * | 11/2007 | Chen | 348/624 |

FOREIGN PATENT DOCUMENTS

JP 2000-134510 5/2000

* cited by examiner

*Primary Examiner*—Paulos M Natnael
(74) *Attorney, Agent, or Firm*—Renner, Kenner, Greive, Bobak, Taylor & Weber

(57) ABSTRACT

Four high-frequency components are extracted from video signals: the first from a blanking interval; the second from an image-carrying period between blanking intervals; and the third and fourth from the video and one-line and -frame delayed signals, respectively. Statistical processing is performed to obtain absolute values of the second to fourth component levels per pixel and the number of pixels of the components per image per absolute level. A noise detecting signal is generated based on the first component level irrespective of the processing when the level is higher than a predetermined level, if not, first to third levels are obtained for the first to third components, respectively, each having the smallest number of pixels among levels other than zero each having a larger number of pixels than zero for the components. The detecting signal is generated based upon the lowest or second lowest level among the first to third levels.

4 Claims, 5 Drawing Sheets

(a) FLAT IMAGE  (b) SMALL NOISE  (c) LARGE NOISE

NOISE DETECTION APPARATUS AND METHOD, AND NOISE REDUCTION APPARATUS AND METHOD

CROSS-REFERENCE TO RELATED APPLICATIONS

This application is based on and claims the benefit of priority from the prior Japanese Patent Application No. 2005-219813 filed on Jul. 29, 2005, the entire contents of which are incorporated herein by reference.

BACKGROUND OF THE INVENTION

The present invention relates to a noise detection apparatus and a noise detection method for detecting the level of random noises mixed into video signals displayed on a video display apparatus, such as a TV and a monitor screen, and also a noise reduction apparatus and a noise reduction method for reducing such random noises depending on detected noise levels.

Known noise reduction apparatuses employ noise reduction techniques such as coring and recursive filtering.

FIG. 1 shows a block diagram of a known noise reduction apparatus employing coring for noise reduction.

In FIG. 1, a video signal input via an input terminal 200 is supplied to a subtractor 201, a high-pass filter (HPF) 202, and a noise detector 203.

The HPF 202 extracts high-frequency components of the input video signal and supplies them to the subtractor 201 and also a coring unit 204. The subtractor 201 subtracts the high-frequency components from the input video signal to extract low-frequency components of the video signal and supplies them to an adder 205.

The noise detector 203 extracts a high-frequency-component signal of the input video signal during each vertical or horizontal blanking interval to determine that a higher-level high-frequency-component signal carries larger random noises. Detection during the vertical or horizontal blanking interval is accurate due to no images during the interval. A resultant noise detection signal is supplied to the coring unit 204.

The coring unit 204 removes low-level components lower than a predetermined level from the high-frequency components of the video signal supplied by the HPF 202 according to its coring characteristics and supplies the remaining components to the adder 205. Noises are reduced through coring because they are normally low-level high-frequency components.

FIG. 2 shows the coring characteristics with output signal levels on the axis of ordinate versus input signal levels on the axis of abscissa. It is shown that an output signal level is zero when the absolute value of an input signal level is equal to or smaller than the absolute value of a threshold level Th whereas the former depends on the latter when the latter is larger than |Th|; a larger |Th| providing a higher noise reduction performace.

According to the coring characteristics shown in FIG. 2, the coring unit 204 varies the absolute value of the threshold level Th, in response to the resultant noise detection signal supplied from the noise detector 203. In detail, the coring unit 204 increases (decreases) |Th| as the random noises detected by the detector 203 are larger (smaller), thus outputting noise-reduced high-frequency components.

In FIG. 1, the adder 205 adds the noise-reduced high-frequency components and the low-frequency components from the subtractor 201, to output a noise-reduced video signal via an output terminal 206.

As described, in the known noise reduction apparatus shown in FIG. 1, the coring unit 204 outputs a lower-level video signal, with a smaller |Th| in the coring characteristics for smaller random noises. Thus, the known apparatus reduces a phenomenon in which not only noise components but also lower-level video signal components are inevitably removed when an input video signal carries smaller noises.

FIG. 3 shows a block diagram of another known noise reduction apparatus employing recursive filtering for noise reduction.

In FIG. 3, a video signal input via an input terminal 210 is supplied to an adder 211, a subtractor 212, and a noise detector 213.

The output signal of the adder 211 is output via an output terminal 214 as an output video signal and further supplied to a frame delay unit 215. The unit 215 delays the output video signal by one frame and supplies the frame-delayed video signal to the subtractor 212. The subtractor 212 subtracts the input video signal from the frame-delayed video signal to output a resultant subtraction signal carrying no interframe correlation to an attenuator 216. The adder 211 adds the input signal and the output signal of the attenuator 216 to output an output signal via the output terminal 214.

Like the noise detector 203 shown in FIG. 1, the noise detector 213 extracts a high-frequency-component signal of the input video signal during a vertical or a horizontal blanking interval to determine that a higher-level high-frequency-component signal carries larger random noises. Detection during the vertical or horizontal blanking interval is accurate due to no images during the interval. A resultant noise detection signal is supplied to the attenuator 216.

In general, a video signal carrying a still image or an image with almost no motion exhibits a strong interframe correlation whereas random noises mixed in the video signal exhibit no correlation.

Thus, the output signal of the subtractor 212 that is an interframe differential signal carries low-level noise components.

Any attenuation coefficient "k" other than zero at the attenuator 216 causes recursive addition of the noise components (output by the subtractor 212) along the loop from the adder 211 to the attenuator 216 via the frame delay unit 215 and the subtractor 212, with weighting of "k", thus achieving recursive noise reduction, with a noise-reduced video signal being output via the output terminal 214.

In contrast, for a video signal carrying a moving image, the output signal of the subtractor 212 (an interframe differential signal) carries high-level motion components. In response to the high-level motion components, an attenuation coefficient "k" of zero gives an output of zero to the adder 211 from the attenuator 216. Then, the adder 211 adds zero to the input video signal supplied via the input terminal 210, with no recursive noise reduction. The input video signal thus passes through the adder 211 and is output via the output terminal 214.

FIG. 4 shows exemplary non-linear attenuation characteristics for the attenuator 216, with output signal levels on the axis of ordinate versus input signal levels on the axis of abscissa. An attenuation ratio "k" (k=y/x) is adjusted to be closer to 1 for an input signal that can be treated as noise components when the absolute value of its level is smaller than |Xn|. In contrast, "k" is adjusted to be closer to zero as the absolute value of an input signal level becomes larger. In particular, the ratio "k" is set at zero when the absolute value of an input signal level is equal to or larger than |Xn| because such a signal level can be treated as motion components.

The attenuation characteristics of the attenuator 216 is adjusted to have a larger absolute value |Xn| for larger random noises detected by the noise detector 213 to achieve recursive noise reduction, in response to the resultant noise detection signal from the detector 213.

As described, the known noise reduction apparatus shown in FIG. 3 performs recursive noise reduction with weighting an attenuation coefficient "k" on a video signal carrying a still image or an image with almost no motion, thus achieving reduction of only noise components while high-frequency components remaining unchanged. Because, for such a video signal, an interframe differential signal supplied from the subtractor 212 to the attenuator 216 has a smaller absolute value than |Xn| (FIG. 4).

A further known frame-recursive noise reduction apparatus is disclosed, for example, in Japanese Unexamined Patent Publication No. 2000-134510 (referred to as document 1, hereinafter).

The apparatus disclosed in the document 1 functions as follows: An input video signal is multiplied by "1−K" whereas an output video signal is delayed by one frame and multiplied by "K". The frame-delayed and "K"-multiplied output signal is added to the "K−1"-multiplied input signal, thus generating a noise-reduced output video signal with no frame correlation. Recursive coefficient adjustment is performed in which the coefficient "K" is adjusted to be larger for higher noise reduction performance to an input video signal carrying still images with no afterimages whereas be smaller to reduce afterimage interference to an input video signal carrying moving images and thus having afterimages.

The known apparatus in the document 1 is equipped with a motion detector to determine that an input video signal carries a still image or a moving image depending on the degree of an interframe difference between a present frame and a previous frame in the video signal in relation to a predetermined threshold level. The coefficient "K" is varied according to whether the input video signal carries a still image or a moving image.

The known apparatus in the document 1 is equipped further with a field strength detector that raises the threshold level for the motion detector in determination of whether an input video signal carries a still image or a moving image when an electric field strength of an input video signal is weaker than a predetermined level, thus adaptively controlling the coefficient "K" depending on the field strength level.

The field strength detector is used when the known apparatus is installed in a TV in which the motion detector could erroneously determine that an input video signal carries a moving image even if it carries a still image due to noises spread over a screen when the video signal is a low-S/N signal.

Although several advantages of the known apparatuses are discussed above, these apparatuses have the following disadvantages:

The known noise reduction apparatus shown in FIG. 1 employs spatial filtering to achieve noise reduction irrespective of motion of images. It is, however, a non-recursive type and hence a relatively larger |Th| in the coring characteristics could inevitably cause that not only noises but also minute high-frequency components are removed, thus improvements in S/N being more or less 3 dB.

Compared to the coring-type apparatus in FIG. 1, the known noise reduction apparatus shown in FIG. 3 employing recursive filtering has much improvement in S/N. Nevertheless, the latter achieves noise reduction only to still images or images with almost no motion. In other words, it will not work for noise reduction in moving images. Moreover, the non-linear attenuation characteristics of the attenuator 216 is required to be changed gradually depending on the noise level detected by the noise detector 213. It is, however, difficult to apply different non-linear attenuation-characteristics modes to the attenuator 216 and gradually change these modes, which could result in a big change in noise reduction performance when the noise level varies.

The known noise reduction apparatus disclosed in the document 1 achieves higher noise reduction performance to still images or images with almost no motion, with adjustments to the coefficient "K" depending on interframe differences, whereas not so effective on moving images due to smaller coefficient "K" for reducing afterimage interference.

When it comes to noise reduction in the vertical and/or horizontal blanking intervals, the noise detectors 203 and 213 shown in FIGS. 1 and 3, respectively, detect the noise level of an input video signal during each blanking interval. In other words, they cannot detect noises for a video signal that has noises on images only (even if they are large) whereas carries no noises during the blanking intervals. Such a signal having noises on images only whereas carrying no noises during the blanking intervals is, for example, an output signal of a video recording/reproduction apparatus in which the output signal carries recorded image only, with blanking intervals being added when the signal is reproduced.

Therefore, the known noise reduction apparatuses shown in FIGS. 1 and 3 cannot achieve high noise reduction performance to such a signal carrying no noises during the blanking interval even if it has large noises on images. The same is true for the known noise reduction apparatus disclosed in the document 1 in which the motion detector is controlled depending on an electric field strength of an input video signal detected through the use of a signal included in the vertical synchronizing period or equalizing period.

SUMMARY OF THE INVENTION

A purpose of the present invention is to provide a noise detection apparatus and a noise detection method that accurately detect noises from a video signal that has noises on images only whereas no noises during the vertical and/or horizontal blanking intervals.

Another purpose of the present invention is to provide a noise reduction apparatus and a noise reduction method that achieve much improvement in S/N for moving images as well as still images and images with almost no motion and also a high noise reduction performance against varying noise levels.

The present invention provides a noise detecting apparatus for detecting noise components involved in a video signal comprising: a first high-frequency component extractor to extract a first high-frequency component from the video signal, the first high-frequency component being involved in the video signal during each blanking interval of the video signal; a second high-frequency component extractor to extract a second high-frequency component from the video signal, the second high-frequency component being involved in the video signal in a horizontal direction for each of pixels that constitute each image carried by the video signal during each image-carrying period located between adjacent blanking intervals; a third high-frequency component extractor to extract a third high-frequency component from the video signal, the third high-frequency component being involved in the video signal in a vertical direction for each pixel, by using the video signal and a 1-line delayed video signal generated by delaying the video signal by one line in the vertical direction; a fourth high-frequency component extractor to extract a fourth high-frequency component from the video signal, the fourth high-frequency component being involved in the video signal in a time direction for each pixel, by using the video signal and a 1-frame delayed video signal generated by delaying the video signal by one frame in the time direction; a statistical processor to obtain an absolute value of each of levels of the second, the third and the fourth high-frequency components for each pixel, and obtain the number of pixels in each image per level in absolute value from a level zero to at least a predetermined level in a range from the level zero to a maximum level in absolute value for each of the second, the third and the fourth high-frequency components; and a noise detector to generate a noise detecting signal based on a level of the first high-frequency component irrespective of a result of statistical processing of the statistical processor when the level of the first high-frequency component is higher than a predetermined level whereas, when the level of the first high-frequency component is equal to or lower than the predetermined level, obtain three levels, as a first noise level, a second noise level and a third noise level for the second, the third and the fourth high-frequency components, respectively, each of the three levels having the smallest number of pixels among levels other than the level zero each having a larger number of pixels than the level zero for the corresponding high-frequency component, and generate a noise detecting signal based the lowest or the second lowest noise level among the first, the second and the third noise levels.

Moreover, the present invention provides a noise detecting method of detecting noise components involved in a video signal comprising the steps of: extracting a first high-frequency component from the video signal, the first high-frequency component being involved in the video signal during each blanking interval of the video signal; extracting a second high-frequency component from the video signal, the second high-frequency component being involved in the video signal in a horizontal direction for each of pixels that constitute each image carried by the video signal during each image-carrying period located between adjacent blanking intervals; extracting a third high-frequency component from the video signal, the third high-frequency component being involved in the video signal in a vertical direction for each pixel, by using the video signal and a 1-line delayed video signal generated by delaying the video signal by one line in the vertical direction; extracting a fourth high-frequency component from the video signal, the fourth high-frequency component being involved in the video signal in a time direction for each pixel, by using the video signal and a 1-frame delayed video signal generated by delaying the video signal by one frame in the time direction; performing statistical processing to obtain an absolute value of each of levels of the second, the third and the fourth high-frequency components for each pixel, and obtain the number of pixels in each image per level in absolute value from a level zero to at least a predetermined level in a range from the level zero to a maximum level in absolute value for each of the second, the third and the fourth high-frequency components; and generating a noise detecting signal based on a level of the first high-frequency component irrespective of a result of the statistical processing when the level of the first high-frequency component is higher than a predetermined level whereas, when the level of the first high-frequency component is equal to or lower than the predetermined level, obtaining three levels, as a first noise level, a second noise level and a third noise level for the second, the third and the forth high-frequency components, respectively, each of the three levels having the smallest number of pixels among levels other than the level zero each having a larger number of pixels than the level zero for the corresponding high-frequency component, and generating a noise detecting signal based the lowest or the second lowest noise level among the first, the second and the third noise levels.

Furthermore, the present invention provides a noise reduction apparatus for reducing noise components involved in a video signal comprising: a line recursive filter to perform noise reduction while weighting a first attenuation coefficient on the video signal; a frame recursive filter to perform noise reduction while weighting a second attenuation coefficient on the video signal; a first high-frequency component extractor to extract a first high-frequency component from the video signal, the first high-frequency component being involved in the video signal during each blanking interval of the video signal; a second high-frequency component extractor to extract a second high-frequency component from the video signal, the second high-frequency component being involved in the video signal in a horizontal direction for each of pixels that constitute each image carried by the video signal during each image-carrying period located between adjacent blanking intervals; a third high-frequency component extractor to extract a third high-frequency component from the video signal, the third high-frequency component being involved in the video signal in a vertical direction for each pixel, by using the video signal and a 1-line delayed video signal generated by delaying the video signal by one line in the vertical direction; a fourth high-frequency component extractor to extract a fourth high-frequency component from the video signal, the fourth high-frequency component being involved in the video signal in a time direction for each pixel, by using the video signal and a 1-frame delayed video signal generated by delaying the video signal by one frame in the time direction; a statistical processor to obtain an absolute value of each of levels of the second, the third and the fourth high-frequency components for each pixel, and obtain the number of pixels in each image per level in absolute value from a level zero to at least a predetermined level in a range from the level zero to a maximum level in absolute value for each of the second, the third and the fourth high-frequency components; and a noise detector to generate a noise detecting signal based on a level of the first high-frequency component irrespective of a result of statistical processing of the statistical processor when the level of the first high-frequency component is higher than a predetermined level whereas, when the level of the first high-frequency component is equal to or lower than the predetermined level, obtain three levels, as a first noise level, a second noise level and a third noise level for the second, the third and the fourth high-frequency components, respectively, each of the three levels having the smallest number of pixels among levels other than the level zero each having a larger number of pixels than the level zero for the corresponding high-frequency component, and generate a noise detecting signal based the lowest or the second lowest noise level among the first, the second and the third noise levels, the first and the second attenuation coefficients being varied based on the generated noise detecting signal.

Still furthermore, the present invention provides a noise reduction method of reducing noise components involved in a video signal comprising the steps of: performing noise reduction while weighting a first attenuation coefficient on the video signal by using a line recursive filter; performing noise reduction while weighting a second attenuation coefficient on the video signal by using a frame recursive filter; extracting a first high-frequency component from the video signal, the first high-frequency component being involved in the video signal during each blanking interval of the video signal; extracting a second high-frequency component from the video signal, the second high-frequency component being involved in the video signal in a horizontal direction for each of pixels that constitute each image carried by the video signal during each image-carrying period located between adjacent blanking intervals; extracting a third high-frequency component from the video signal, the third high-frequency component being involved in the video signal in a vertical direction for each pixel, by using the video signal and a 1-line delayed video signal generated by delaying the video signal by one line in the vertical direction; extracting a fourth high-frequency component from the video signal, the fourth high-frequency component being involved in the video signal in a time direction for each pixel, by using the video signal and a 1-frame delayed video signal generated by delaying the video signal by one frame in the time direction; performing statistical processing to obtain an absolute value of each of levels of the second, the third and the fourth high-frequency components for each pixel, and obtain the number of pixels in each image per level in absolute value from a level zero to at least a predetermined level in a range from the level zero to a maximum level in absolute value for each of the second, the third and the fourth high-frequency components; generating a noise detecting signal based on a level of the first high-frequency component irrespective of a result of the statistical processing when the level of the first high-frequency component is higher than a predetermined level whereas, when the level of the first high-frequency component is equal to or lower than the predetermined level, obtain three levels, as a first noise level, a second noise level and a third noise level for the second, the third and the fourth high-frequency components, respectively, each of the three levels having the smallest number of pixels among levels other than the level zero each having a larger number of pixels than the level zero for the corresponding high-frequency component, and generating a noise detecting signal based the lowest or the second lowest noise level among the first, the second and the third noise levels; and varying the first and the second attenuation coefficients based on the generated noise detecting signal.

DETAILED DESCRIPTION OF PREFERRED EMBODIMENTS

Preferred embodiments according to the present invention will be disclosed in detail.

Figure 5:
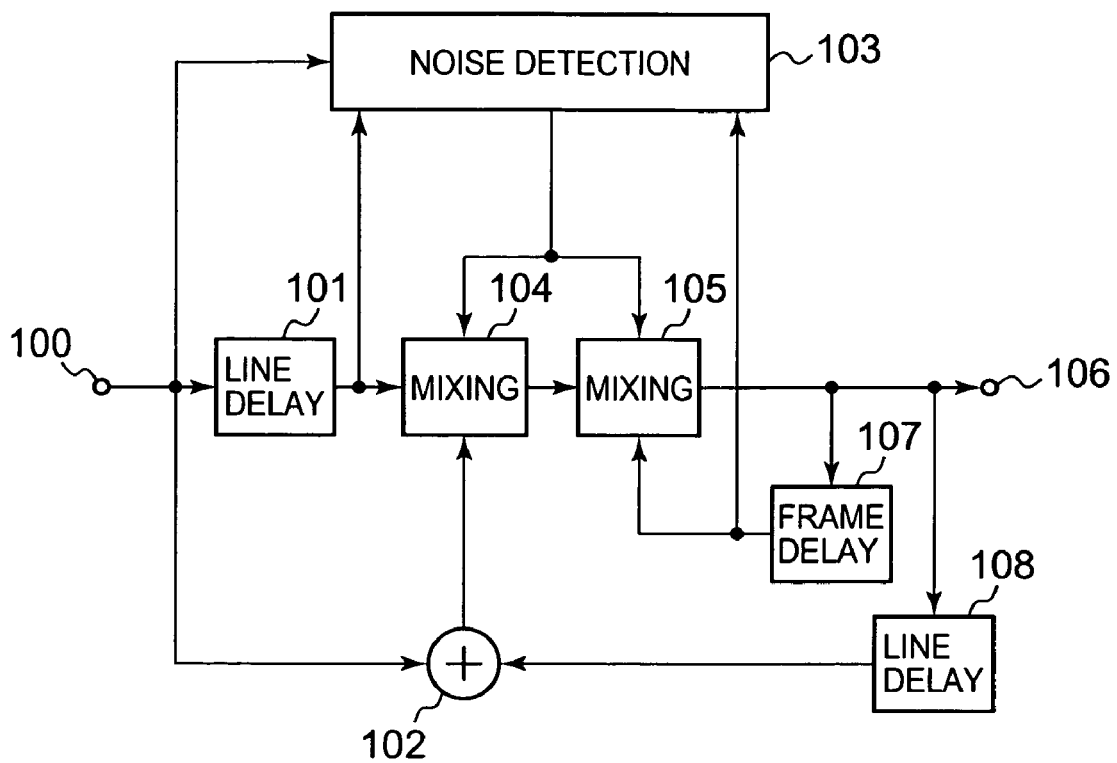
FIG. 5 shows a block diagram of a preferred embodiment of a noise reduction apparatus according to the present invention.

FIG. 5 shows a block diagram of a preferred embodiment of a noise reduction apparatus according to the present invention.

The noise reduction apparatus shown in FIG. 5 includes a line delay unit 101, an adder 102, a noise detector 103, series-connected mixers 104 and 105, a frame delay unit 107, and a line delay unit 108.

An input video signal supplied via an input terminal 100 is delayed by one line by the line delay unit 101. The input video signal is further added with an output delayed signal from the line delay unit 108. Noise detection is performed by the noise detector 103 based on the input video signal, a 1-line-delayed video signal from the line delay unit 101, and a 1-frame-delayed video signal from the frame delay unit 107. An output video signal from the mixer 105 is output via an output terminal 106 and also supplied to the frame delay unit 107 and the line delay unit 108.

An output 1-line-delayed video signal from the line delay unit 101 is supplied to the noise detector 103 and also adaptively mixed with an output signal from the adder 102 by the mixer 104, which will be described later in detail. A resultant composite signal is supplied to the mixer 105. A adaptive-mixing ratio at the mixer 104 is varied when a control signal is supplied from the noise detector 103.

An output composite signal from the mixer 104 and an output 1-frame-delayed video signal from the frame delay unit 107 are adaptively mixed with each other by the mixer 105 that works in the same as the mixer 104, at the same adaptive-mixing ratio that is varied when the control signal is supplied from the noise detector 103.

An output composite signal from the mixer 105 is supplied to the frame delay unit 107 to be subjected to 1-frame delay. An output 1-frame-delayed signal from the frame delay unit 107 is supplied to the noise detector 103 and also returned to the mixer 105. The output signal from the mixer 105 is output via the output terminal 106 and also supplied to the line delay unit 108 to be subjected to 1-line delay. An output 1-line-delayed video signal from the line delay unit 108 is supplied to the adder 102 to be added with the input video signal. A resultant addition signal is supplied to the mixer 104.

Figure 6:
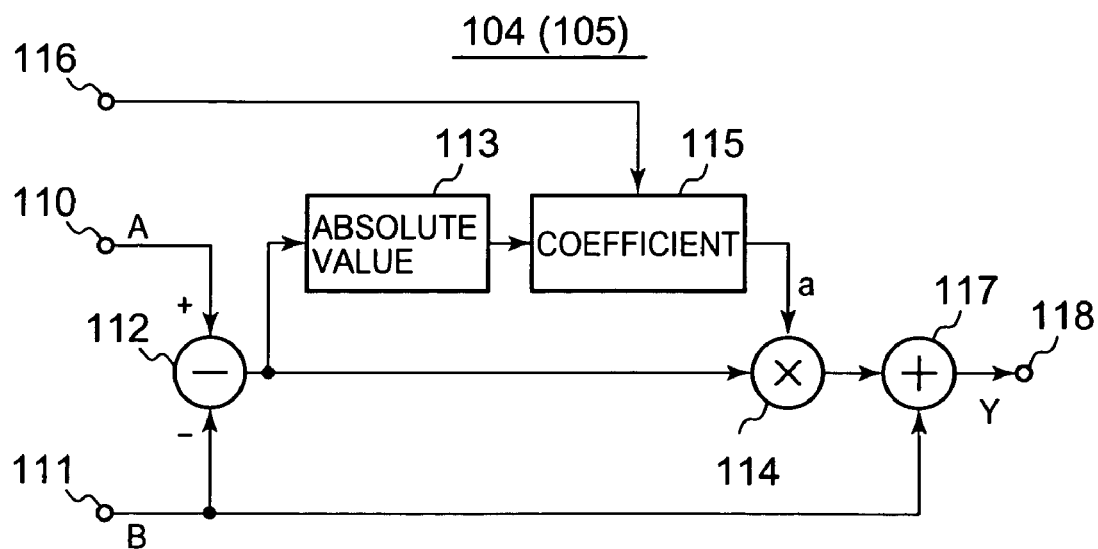
FIG. 6 shows a block diagram of mixers in the preferred embodiment shown in FIG. 5.

FIG. 6 shows a block diagram of the mixers 104 and 105 in the preferred embodiment (FIG. 5) of a noise reduction apparatus according to the present invention.

Supplied to a subtractor 112 in FIG. 6 are a first input video signal "A" and a second input video signal "B" input via input terminals 110 and 111, respectively. The subtractor 112 subtracts the second input video signal "B" from the first input video signal "A". A resultant differential signal is supplied to an absolute-value generator 113 and a multiplier 114.

The absolute-value generator 113 generates an absolute value of the differential signal and supplies an absolute-value signal to a coefficient generator 115. Depending on the level of the absolute-value signal and also the level of a signal (the control signal from the noise detector 103 in FIG. 5, which will be discussed later) supplied via an input terminal 116, the coefficient generator 115 generates a multiplication coefficient "α" and supplies it to a multiplier 114.

The multiplier 114 multiplies the differential signal from the subtractor 112 and the multiplication coefficient "α" and supplies a resultant multiplication signal to the adder 117.

The adder 117 adds the multiplication signal to the second input video signal "B" input via the input terminal 111 to output a resultant addition signal via an output terminal 118, as an output signal "Y" which is expressed as shown below.

$$Y=B+\alpha(A-B)=\alpha A+(1-\alpha)B \quad (1)$$

The expression (1) teaches that the multiplication coefficient "α" generated by the coefficient generator 115 in the range from 0 to 1 allows the first and second input video signals "A" and "B" to be adaptively mixed with each other.

The first input video signal "A" corresponds to the output signal of the line delay unit 101 in FIG. 5 when the circuitry shown in FIG. 6 is used as the mixer 104 whereas to the output signal of the mixer 104 when the circuitry is used as the mixer 105.

The second input video signal "B" corresponds to the output signal of the adder 102 in FIG. 5 when the circuitry shown in FIG. 6 is used as the mixer 104 whereas to the output signal of the frame delay unit 107 when the circuitry is used as the mixer 105.

In the embodiment shown in FIG. 5 (and also FIG. 6), the loop from the mixer 104 to the adder 102 via the mixer 105 and the line delay unit 108 constitutes a line recursive filter for noise reduction with weighting the attenuation coefficient (1−α) on a video signal. In contrast, the other loop from the mixer 105 to the frame delay unit 107 constitutes a frame recursive filter for noise reduction with weighting (1−α) on the video signal.

The same attenuation coefficient (1−α) is used for both of the line and frame recursive filters for simplicity of description. Nevertheless, the multiplication coefficient "α" generated by the coefficient generator 115 (FIG. 6) may or may not be the same value for the mixers 104 and 105, or it can take any value suitable for the respective mixers.

The output differential signal from the subtractor 112 (FIG. 6) carries an interline difference for the mixer 104 whereas an interframe difference for the mixer 105.

For a spatially flat image with less edge components and a still image, a video signal carries a strong correlation in spatial and/or time domains, whereas random noises mixed in the video signal have no correlation.

Thus, the output differential signal from the subtractor 112 (FIG. 6) carrying an interline or interframe difference is a low-level noise component when an input video signal carries such a spatially flat image with few edge components or a still image. For such images, the mixers 104 and/or 105 are/is controlled by the noise detector 103 to generate a larger attenuation coefficient (1−α) for a higher noise level detected by the detector 103, for recursive noise reduction.

In contrast, the output differential signal from the subtractor 112 carrying an interline or interframe difference is a high-level edge or motion component when an input video signal carries an image with many edge components or a moving image. For such images, the mixers 104 and/or 105 are/is controlled by the noise detector 103 to generate zero as the attenuation coefficient (1−α) so that recursive noise reduction is not performed.

Such selective recursive noise reduction depending on images can be achieved with the multiplication coefficient "α" that is generated by the coefficient generator 115 (FIG. 6) as proportional to the output level of the absolute-value generator 113 that indicates the level of interline or interframe difference.

Figure 7:
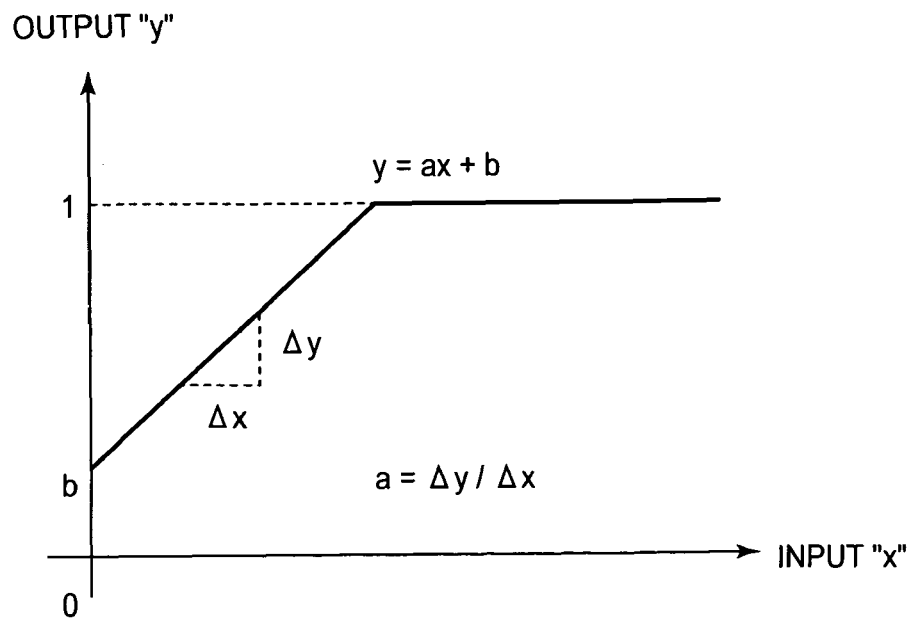
FIG. 7 shows exemplary input versus output characteristics for a coefficient generator shown in FIG. 6.

FIG. 7 shows exemplary input versus output characteristics for the coefficient generator 115, with output signal levels "y" (multiplication coefficient "α") on the axis of ordinate versus input signal levels "x" on the axis of abscissa.

The input versus output characteristics shown in FIG. 7 can be expressed as follows:

$$y=ax+b \quad (2)$$

The characteristics for noise reduction can be modified by varying parameters "a" (=Δy/Δx) and "b". The parameters are varied in response to the signal supplied via the input terminal 116 (FIG. 6). A larger parameter "a" does not give zero as the attenuation coefficient (1−α) unless the input signal level "x", or the interline and/or interframe differences are/is large enough. In contrast, a larger parameter "b" tends to give zero as the attenuation coefficient (1−α) even if the interline and/or interframe differences are/is small.

The noise reduction performance can be gradually controlled with the control signal supplied via the input terminal 116 from the noise detector 103 (FIG. 5), according to variation in random noises: for example, the larger the random noises, the smaller the parameter "a" or "b". This provides a larger attenuation coefficient (1−α) that is a rate at which the line and/or frame recursive filters work, to reduce more noises, as indicated by the expression (1).

Figure 8:
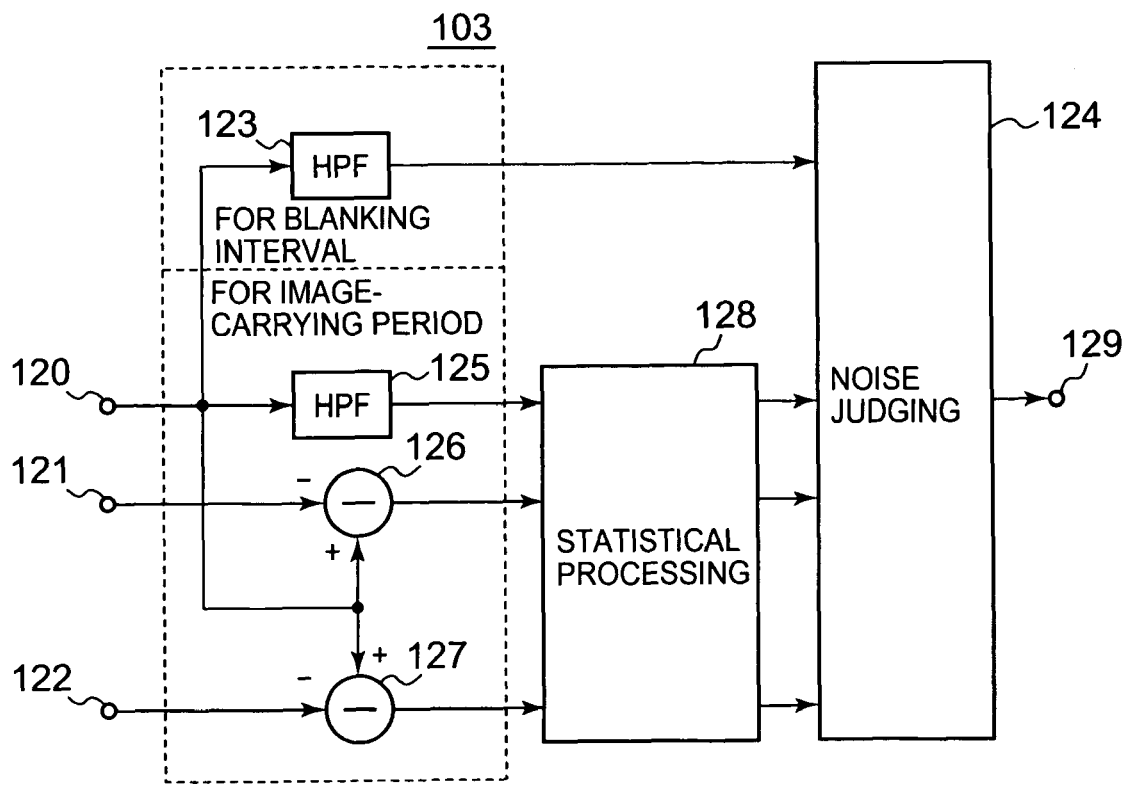
FIG. 8 shows a block diagram of a preferred embodiment of a noise detecting apparatus according to the present invention.

Disclosed next in detail with reference to FIG. 8 is the noise detector 103 (FIG. 5) which is an embodiment of a noise detection apparatus and a noise detection method in the present invention.

Supplied via input terminals 120, 121 and 122 are a video signal input via the input terminal 100, a 1-line-delayed video signal from the line delay unit 101, and a 1-frame-delayed video signal from the frame delay unit 107, respectively, shown in FIG. 5.

The noise detector 103 includes: high-pass filters (HPF) 123 and 125, and subtractors 126 and 127 to which an input video signal is supplied via the input terminal 120; a statistical processor 128 to which the output signals of the HPF 125 and the subtractors 126 and 127 are supplied, and a noise judging unit 124 to perform noise judgment based on the output signals from the HPF 123 and the statistical processor 128. The HPF 123 and 125, and the subtractors 126 and 127 each functions as a high-frequency component extractor.

Figure 1:
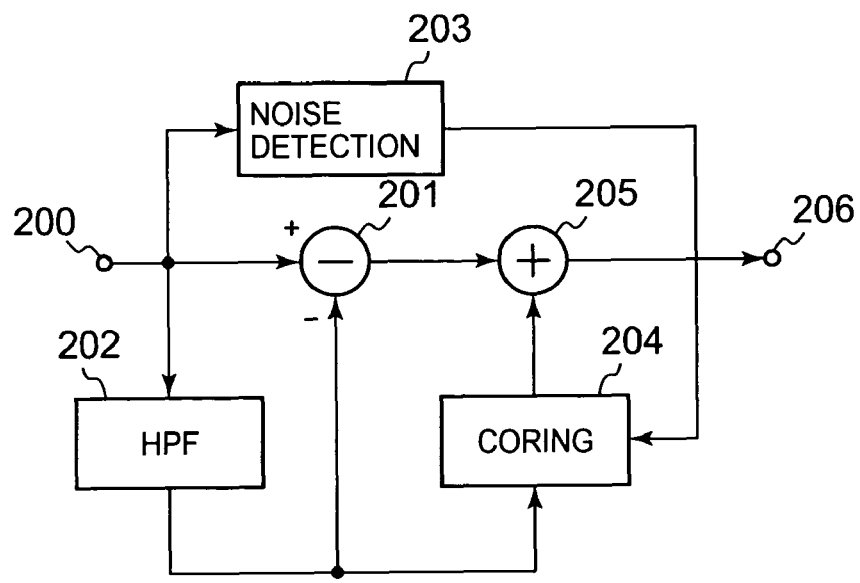
FIG. 1 shows a block diagram of a known noise reduction apparatus employing coring for noise reduction.
Figure 2:
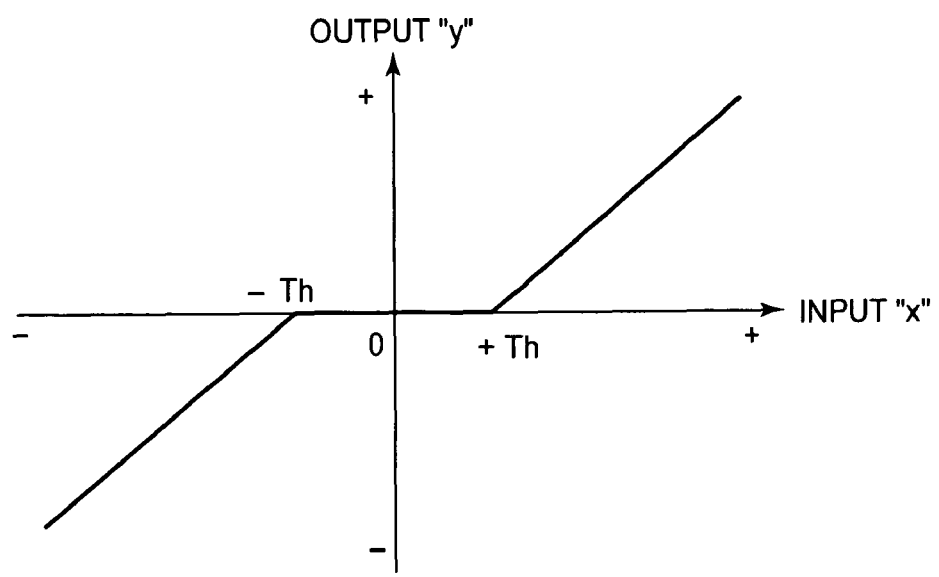
FIG. 2 shows the coring characteristics for a coring unit shown in FIG. 1.
Figure 3:
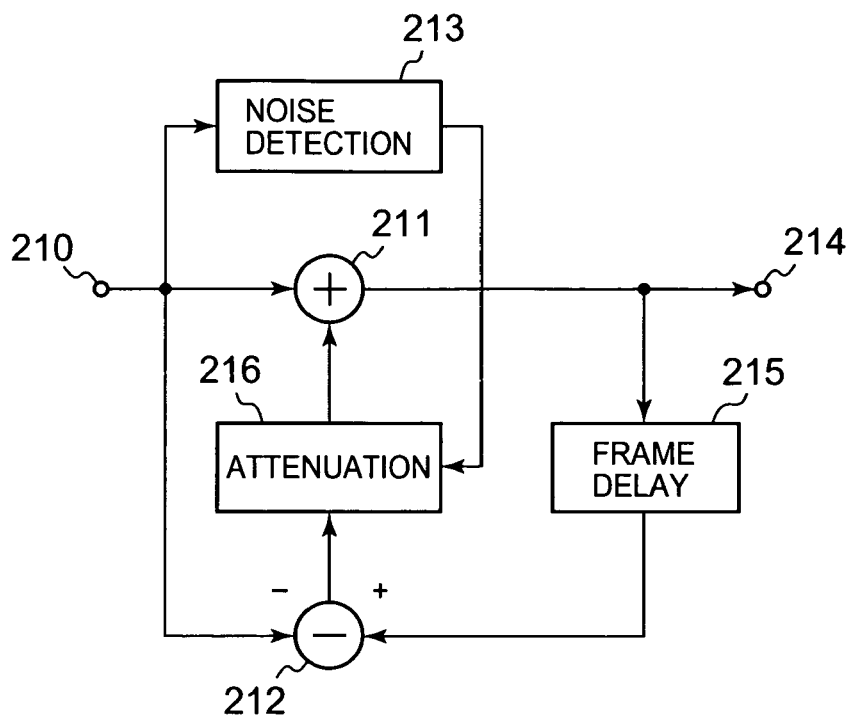
FIG. 3 shows a block diagram of another known noise reduction apparatus employing recursive filtering for noise reduction.
Figure 4:
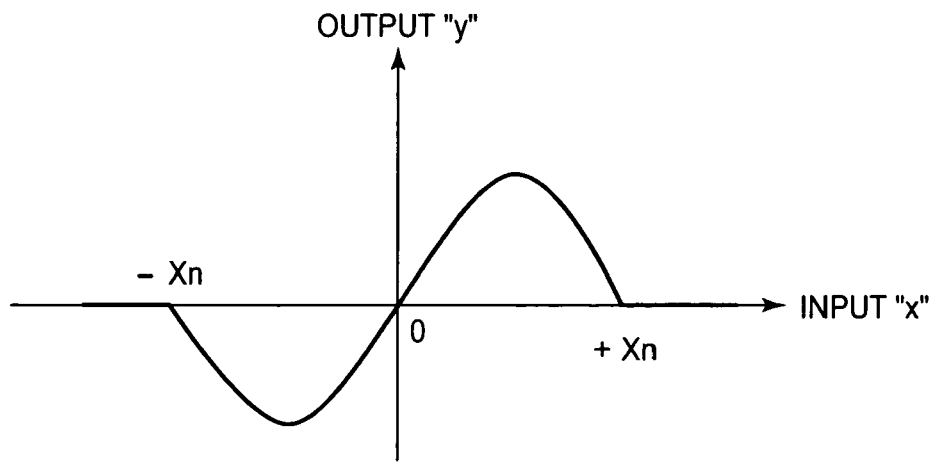
FIG. 4 shows exemplary non-linear attenuation characteristics for an attenuator shown in FIG. 3.

When an input video signal is supplied to the HPF 123 via the input terminals 100 and 120, the HPF 123 extracts high-frequency components from the video signal during each vertical or horizontal blanking interval and sends the high-frequency components to the noise judging unit 124 which works like the noise detectors in FIGS. 1 and 3; while the HPF 125 extracts horizontal high-frequency components from the video signal during each image-carrying period located between adjacent vertical or horizontal blanking intervals.

The subtractor 126 subtracts a 1-line-delayed video signal supplied from the line delay unit 101 (FIG. 5) and input via the input terminal 121 from the video signal input via the input terminal 120, to extract vertical high-frequency components from the video signal during each image-carrying period.

In contrast, the subtractor 127 subtracts a 1-frame-delayed video signal supplied from the frame delay unit 107 (FIG. 5) and input via the input terminal 122 from the video signal input via the input terminal 120, to extract time-domain high-frequency components from the video signal during each image-carrying period.

Any pixel of a video signal possesses values for the three-types of high-frequency components: horizontal, vertical and time-domain high-frequency components.

A difference between each 2-adjacent-pixel pair is taken in each of the horizontal, vertical and time directions for obtaining the three-types of high-frequency components, in this embodiment, as discussed above. Each high-frequency component may, however, be extracted with filtering based on plural number of pixels. Any suitable technique may be employed in extracting each of the high-frequency components.

The horizontal, vertical and time-domain high-frequency components extracted by the HPF 125, the subtractor 126 and the subtractor 127, respectively, are supplied to the statistical processor 128. The processor 128 obtains the level of each of these high-frequency components for each pixel of respective images, generates an absolute value for each level, and aggregates the pixels having the same absolute value to obtain the number of pixels having the same absolute value for each of the high-frequency components in each image.

One image may correspond to a frame carried by a non-interlaced (progressive) video signal or one of two fields carried by an interlaced video signal. The number of pixels having the same absolute value for each of the high-frequency components in each image is supplied to the noise judging unit 124.

Such number of pixels may not be obtained when levels of the horizontal, vertical and time-domain high-frequency components are too high as noises. For example, in an 8-bit digital video signal, the horizontal, vertical and time-domain high-frequency components are distributed over levels from 0 to 255. Any of the components having a level of about 10 or higher in this range cannot be treated as noises.

Obtained in this embodiment is the number of pixels discussed above in 10 levels from 0 to 9. Or, it may be, for example, obtained in 12 levels from 0 to 11, depending on an allowable degree of errors. In other words, obtained in this invention is the number of pixels having the same absolute value from the level 0 to a certain level in the range from the level 0 to a certain appropriate maximum level for each of the horizontal, vertical and time-domain high-frequency components, in each image (a frame or a field).

Suppose that the following elements (A, B) are obtained for the horizontal high-frequency components, where "A" and "B" indicate a level and the number of pixels, respectively: (−9, 0), (−8, 0), (−7, 0), (−6, 1), (−5, 2), (−4, 4), (−3, 5), (−2, 6), (−1, 7), (0, 9), (1, 8), (2, 6), (3, 5), (4, 3), (5, 0), (6, 0), (7, 0), (8, 0) and (9, 0).

The number of pixels in each level in absolute value for the horizontal high-frequency components is: (|0|, 9), (|1|, 15, (|2|, 12), (|3|, 0), (|4|, 7), (|5|, 2), (|6|, 1), (|7|, 0), (|8|, 0) and (|9|, 0).

As already discussed, statistically, video signals exhibit a strong correlation between adjacent pixels. Thus, the frequency, or the number of the same differential value between adjacent pixels depending on the level of high-frequency components for one frame of a still image or an image with less edge components is distributed as shown in (a) in FIG. 9. The characteristic curve shown in (a) in FIG. 9 has a steep positive peak around zero in differential value. As more random noises are superposed on such an image, the correlation between adjacent pixels becomes weaker. The characteristics of frequency (the number of the same differential value) versus differential value between adjacent pixels thus varies from a steep inverse-chevron-like curve shown in (a) to a moderate inverse-chevron-like curve shown in (b), and further to a convex curve shown in (c) in FIG. 9, with a lower peak.

In FIG. 8, the noise judging unit 124 determines the degree of noises mixed into the input video signal based on the outputs of the HPF 123 and the statistical processor 128 and outputs a resultant noise detection signal via an output terminal 129.

In detail, the noise judging unit 124 determines the noise level according to the level of the high-frequency components from the HPF 123 during each vertical or horizontal blanking interval, irrespective of the output of the statistical processor 128, when the level of the high-frequency components is higher than a predetermined level (for example, zero), thus generating a noise detection signal for each image. This is because the high-frequency components from the HPF 123 represent the level of random noises during each vertical or horizontal blanking interval in which a video signal carries no images. The level of the high-frequency components from the HPF 123 is treated as the noise level in this embodiment.

Contrary to this, the noise judging unit 124 works as described below when the level of the high-frequency components from the HPF 123 is equal to or lower than the predetermined level (for example, zero) mentioned above.

When the output level of the HPF 123 is equal to or lower than the predetermined value, the noise judging unit 124 examines the noise levels during each image-carrying period located between adjacent vertical or horizontal blanking intervals.

In detail, the noise judging unit 124 determines the noise level according to one of the three outputs of the statistical processor 128, which satisfies the following requirements and generates a noise detection signal for each image.

The noise judging unit 124 compares the number of the level 0 in absolute value (the number of pixels having the level 0 in each image) and that of levels other than 0 in absolute value for each of the horizontal, vertical and time-domain high-frequency components, discussed above.

The following are modes of determination done by the noise judging unit 124 based on the comparison of levels in absolute value:

(1) The number of the level 0 is larger than that of levels other than 0 in absolute value. This implies the characteristic curve shown in (a) in FIG. 9. A video signal is judged as carrying a flat image.

(2) There are levels (other than 0) in absolute value of which the number is larger than that of 0, and a particular level among the levels (other than 0) of which the number is the smallest is comparatively low or high. A comparatively low level implies the characteristic curve shown in (b) in FIG. 9. A video signal is judged as carrying small noises. In contrast, a comparatively high level implies the characteristic curve shown in (c) in FIG. 9. A video signal is judged as carrying large noises.

The example above in which the elements (A, B) are obtained for the horizontal high-frequency components shows the following:

The number (the number of pixels) of the level 0 in absolute value is 9. There are levels (other than 0) in absolute value of which the number is larger than 9 of the level 0. A particular level among the levels (other than 0) of which the number is the smallest is |3|. The number is 10 having the level |3|.

The noise judging unit 124 then determines that the horizontal high-frequency components have the noise level 3 in the example.

Suppose that there are first plural levels and the number of each first level is larger than that of the level 0 in absolute value. Further, suppose that there are second plural levels among the first levels and the numbers of the second levels are equally the smallest. In this case, it is preferable that a larger level among the second levels is determined as a noise level.

Through the comparison described above for the horizontal, vertical and time-domain high-frequency components, the noise judging unit 124 selects the smallest level as a noise detection signal. Suppose that noise levels are |3|, |6| and |4| for the horizontal, vertical and time-domain high-frequency components, respectively, obtained in the same way as the example above in which the elements (A, B) are obtained for the horizontal high-frequency components. The noise judging unit 124 selects the level |3| of the horizontal high-frequency components and determines it as the final noise level.

Figure 9:
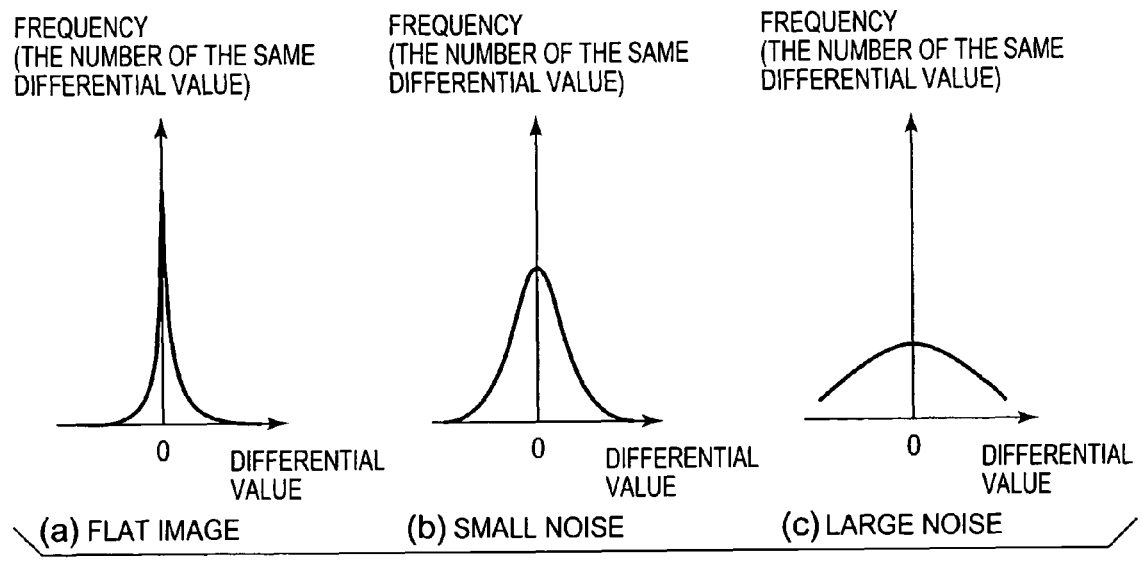
FIG. 9 shows a relationship between noise levels and the characteristics of frequency (the number of the same differential value) versus differential value between adjacent pixels in an input video signal.

As disclosed above, the noise judging unit 124 works to: examine the characteristics of frequency (the number of the same differential value) versus differential value between adjacent pixels of the input video signal during each image-carrying period, based on the comparison described above; examine, to which of the characteristic curves shown in (a), (b) or (c) in FIG. 9, the characteristics of the input video signal falls during each image-carrying period, thus generating a resultant noise detection signal via the output terminal 129; supply the detection signal to the mixers 104 and 105 via the input terminal 116 (FIG. 6); and control the coefficient generator 115 to generate a smaller coefficient "α", or a larger attenuation coefficient (−1−α), for larger detected noises, with smaller parameters "a" and "b" for a higher noise level to have a smaller coefficient "α".

In the foregoing description, a noise detection signal is generated based on the noise level having the smallest absolute value among the noise levels detected for the three-types of high-frequency components: horizontal, vertical and time-domain high-frequency components.

Not only that, a noise detection signal may be generated based on the noise level having the second smallest absolute value among the those noise levels, in this invention. In the foregoing example with the noise levels |3|, |6| and |4| for the horizontal, vertical and time-domain high-frequency components, respectively, the level |4| for the time-domain high-frequency components may be treated as the final noise level instead of |3| for the horizontal high-frequency components.

One requirement for noise detection in this invention is that noise detection is not carried out based on the noise level having the largest absolute value among the noise levels detected for the horizontal, vertical and time-domain high-frequency components. This is because noises are generated randomly, so that there is no situation in which only one of these three types of high-frequency components carries larger noises than the other two.

Moreover, average values or standard deviations of the high-frequency components may be compared instead of the number of the level 0 and other levels (other than 0) in absolute value, in noise detection in this invention.

As disclosed above, in the embodiment of the present invention, noise detection is performed for image-carrying period as well as vertical or horizontal blanking intervals. Therefore, the present invention achieves accurate noise detection even for video signals mixed with noises during not vertical or horizontal blanking intervals but image-carrying periods.

Moreover, in FIG. 5 in the embodiment of the present invention, the loop from the mixer 104 to the adder 102 via the mixer 105 and the line delay unit 108 constitutes a line recursive filter whereas the other loop from the mixer 105 to the frame delay unit 107 constitutes a frame recursive filter. With these two types of recursive filters, the embodiment achieves noise reduction in time and spatial domains to improve S/N for moving images as well as still images.

The embodiments of a noise reduction apparatus and a noise detection apparatus according to the present invention shown in FIGS. 5 and 8, respectively, may be configured with hardware or a computer software program. Such a computer software program may be prestored in a memory installed in a computer or a storage medium and loaded into a computer. Or, it may be distributed over a communications network and loaded into a computer.

Figure 10:
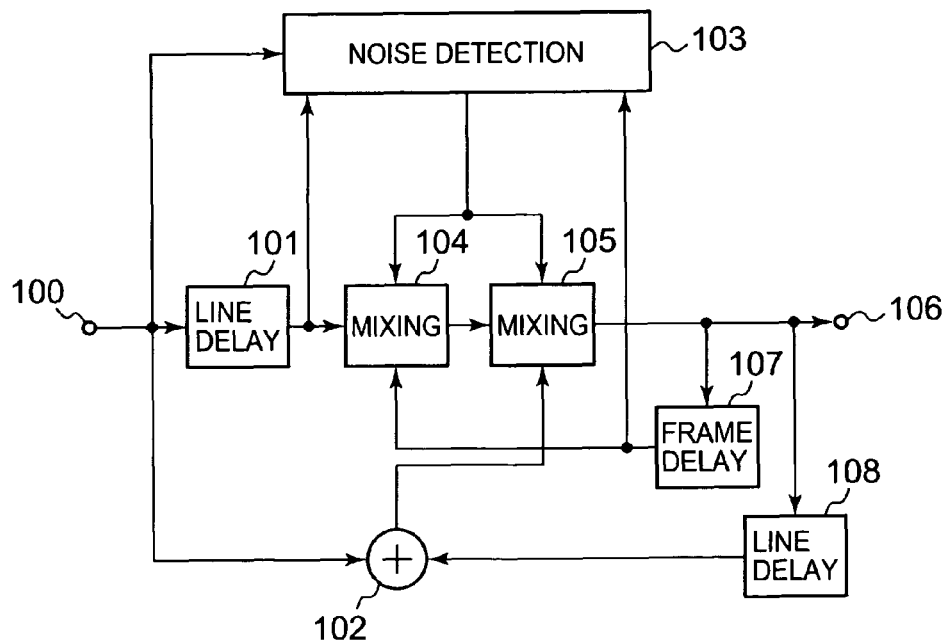
FIG. 10 shows a block diagram of a modification to the embodiment of a noise reduction apparatus according to the present invention, shown in FIG. 5.

Moreover, the embodiment of the present invention show in FIG. 5 is provided the line recursive filter and the frame recursive filter connected to the output of the former filter. This connection can, however, be reversed as shown in FIG. 10. In this modification, the output of the adder 102 is supplied to the mixer 105 while the output of the frame delay unit 107 is supplied to the mixer 104.

Furthermore, coefficient-generation characteristics for the coefficient generator 115 (FIG. 6) of the mixers 104 and/or 105 may not be that shown in FIG. 7. It may be another type of linear characteristics or nonlinear characteristics that varies with inter-line or -frame differences.

As disclosed in detail, the noise detection apparatus and method according to the present invention achieve accurate noise detection even for video signals mixed with noises during not vertical or horizontal blanking intervals but image-carrying periods.

Moreover, the noise reduction apparatus and method according to the present invention achieve accurate noise detection even for video signals mixed with noises during not vertical or horizontal blanking intervals but image-carrying periods, thus improving S/N for moving images as well as still images and keeping high noise reduction performance against varying noise levels.

What is claimed is:

1. A noise detecting apparatus for detecting noise components involved in a video signal comprising:
    a first high-frequency component extractor to extract a first high-frequency component from the video signal, the first high-frequency component being involved in the video signal during each blanking interval of the video signal;
    a second high-frequency component extractor to extract a second high-frequency component from the video signal, the second high-frequency component being involved in the video signal in a horizontal direction for each of pixels that constitute each image carried by the video signal during each image-carrying period located between adjacent blanking intervals;
    a third high-frequency component extractor to extract a third high-frequency component from the video signal, the third high-frequency component being involved in the video signal in a vertical direction for each pixel, by using the video signal and a 1-line delayed video signal generated by delaying the video signal by one line in the vertical direction;
    a fourth high-frequency component extractor to extract a fourth high-frequency component from the video signal, the fourth high-frequency component being involved in the video signal in a time direction for each pixel, by using the video signal and a 1-frame delayed video signal generated by delaying the video signal by one frame in the time direction;
    a statistical processor to obtain an absolute value of each of levels of the second, the third and the fourth high-frequency components for each pixel, and obtain the number of pixels in each image per level in absolute value from a level zero to at least a predetermined level in a range from the level zero to a maximum level in absolute value for each of the second, the third and the fourth high-frequency components; and a noise detector to generate a noise detecting signal based on a level of the first high-frequency component irrespective of a result of statistical processing of the statistical processor when the level of the first high-frequency component is higher than a predetermined level whereas, when the level of the first high-frequency component is equal to or lower than the predetermined level, obtain three levels, as a first noise level, a second noise level and a third noise level for the second, the third and the fourth high-frequency components, respectively, each of the three levels having the smallest number of pixels among levels other than the level zero each having a larger number of pixels than the level zero for the corresponding high-frequency component, and generate a noise detecting signal based the lowest or the second lowest noise level among the first, the second and the third noise levels.

2. A noise detecting method of detecting noise components involved in a video signal comprising the steps of:

extracting a first high-frequency component from the video signal, the first high-frequency component being involved in the video signal during each blanking interval of the video signal;

extracting a second high-frequency component from the video signal, the second high-frequency component being involved in the video signal in a horizontal direction for each of pixels that constitute each image carried by the video signal during each image-carrying period located between adjacent blanking intervals;

extracting a third high-frequency component from the video signal, the third high-frequency component being involved in the video signal in a vertical direction for each pixel, by using the video signal and a 1-line delayed video signal generated by delaying the video signal by one line in the vertical direction;

extracting a fourth high-frequency component from the video signal, the fourth high-frequency component being involved in the video signal in a time direction for each pixel, by using the video signal and a 1-frame delayed video signal generated by delaying the video signal by one frame in the time direction;

performing statistical processing to obtain an absolute value of each of levels of the second, the third and the fourth high-frequency components for each pixel, and obtain the number of pixels in each image per level in absolute value from a level zero to at least a predetermined level in a range from the level zero to a maximum level in absolute value for each of the second, the third and the fourth high-frequency components; and generating a noise detecting signal based on a level of the first high-frequency component irrespective of a result of the statistical processing when the level of the first high-frequency component is higher than a predetermined level whereas, when the level of the first high-frequency component is equal to or lower than the predetermined level, obtaining three levels, as a first noise level, a second noise level and a third noise level for the second, the third and the fourth high-frequency components, respectively, each of the three levels having the smallest number of pixels among levels other than the level zero each having a larger number of pixels than the level zero for the corresponding high-frequency component, and generating a noise detecting signal based the lowest or the second lowest noise level among the first, the second and the third noise levels.

3. A noise reduction apparatus for reducing noise components involved in a video signal comprising:

a line recursive filter to perform noise reduction while weighting a first attenuation coefficient on the video signal;

a frame recursive filter to perform noise reduction while weighting a second attenuation coefficient on the video signal;

a first high-frequency component extractor to extract a first high-frequency component from the video signal, the first high-frequency component being involved in the video signal during each blanking interval of the video signal;

a second high-frequency component extractor to extract a second high-frequency component from the video signal, the second high-frequency component being involved in the video signal in a horizontal direction for each of pixels that constitute each image carried by the video signal during each image-carrying period located between adjacent blanking intervals;

a third high-frequency component extractor to extract a third high-frequency component from the video signal, the third high-frequency component being involved in the video signal in a vertical direction for each pixel, by using the video signal and a 1-line delayed video signal generated by delaying the video signal by one line in the vertical direction;

a fourth high-frequency component extractor to extract a fourth high-frequency component from the video signal, the fourth high-frequency component being involved in the video signal in a time direction for each pixel, by using the video signal and a 1-frame delayed video signal generated by delaying the video signal by one frame in the time direction;

a statistical processor to obtain an absolute value of each of levels of the second, the third and the fourth high-frequency components for each pixel, and obtain the number of pixels in each image per level in absolute value from a level zero to at least a predetermined level in a range from the level zero to a maximum level in absolute value for each of the second, the third and the fourth high-frequency components; and a noise detector to generate a noise detecting signal based on a level of the first high-frequency component irrespective of a result of statistical processing of the statistical processor when the level of the first high-frequency component is higher than a predetermined level whereas, when the level of the first high-frequency component is equal to or lower than the predetermined level, obtain three levels, as a first noise level, a second noise level and a third noise level for the second, the third and the fourth high-frequency components, respectively, each of the three levels having the smallest number of pixels among levels other than the level zero each having a larger number of pixels than the level zero for the corresponding high-frequency component, and generate a noise detecting signal based the lowest or the second lowest noise level among the first, the second and the third noise levels, the first and the second attenuation coefficients being varied based on the generated noise detecting signal.

4. A noise reduction method of reducing noise components involved in a video signal comprising the steps of:

performing noise reduction while weighting a first attenuation coefficient on the video signal by using a line recursive filter;

performing noise reduction while weighting a second attenuation coefficient on the video signal by using a frame recursive filter;

extracting a first high-frequency component from the video signal, the first high-frequency component being involved in the video signal during each blanking interval of the video signal;

extracting a second high-frequency component from the video signal, the second high-frequency component being involved in the video signal in a horizontal direction for each of pixels that constitute each image carried by the video signal during each image-carrying period located between adjacent blanking intervals;

extracting a third high-frequency component from the video signal, the third high-frequency component being involved in the video signal in a vertical direction for each pixel, by using the video signal and a 1-line delayed video signal generated by delaying the video signal by one line in the vertical direction;

extracting a fourth high-frequency component from the video signal, the fourth high-frequency component being involved in the video signal in a time direction for each pixel, by using the video signal and a 1-frame delayed video signal generated by delaying the video signal by one frame in the time direction;

performing statistical processing to obtain an absolute value of each of levels of the second, the third and the fourth high-frequency components for each pixel, and obtain the number of pixels in each image per level in absolute value from a level zero to at least a predetermined level in a range from the level zero to a maximum level in absolute value for each of the second, the third and the fourth high-frequency components;

generating a noise detecting signal based on a level of the first high-frequency component irrespective of a result of the statistical processing when the level of the first high-frequency component is higher than a predetermined level whereas, when the level of the first high-frequency component is equal to or lower than the predetermined level, obtain three levels, as a first noise level, a second noise level and a third noise level for the second, the third and the fourth high-frequency components, respectively, each of the three levels having the smallest number of pixels among levels other than the level zero each having a larger number of pixels than the level zero for the corresponding high-frequency component, and generating a noise detecting signal based the lowest or the second lowest noise level among the first, the second and the third noise levels; and varying the first and the second attenuation coefficients based on the generated noise detecting signal.

* * * * *